United States Patent

[11] 3,601,707

| [72] | Inventor | Douglas M. Bauer |
| | | Danvers, Mass. |
| [21] | Appl. No. | 852,041 |
| [22] | Filed | Aug. 21, 1969 |
| [45] | Patented | Aug. 24, 1971 |
| [73] | Assignee | General Electric Company |

[54] FREQUENCY TO DIRECT CURRENT CONVERTER
7 Claims, 4 Drawing Figs.

[52] U.S. Cl. .................................................. 328/141,
328/26, 328/48, 307/261, 307/304
[51] Int. Cl. ........................................................ H03k 5/20,
H03k 9/06
[50] Field of Search ........................................ 328/41, 42,
48, 140, 141, 155, 26; 307/261, 304

[56] References Cited
UNITED STATES PATENTS
2,978,174 4/1901 Dean et al ...................... 328/42 X
3,268,741 8/1966 Shea .............................. 328/41 X
3,350,580 10/1967 Harrison ....................... 328/48 X Primary Examiner—John S. Heyman
Attorneys—I. David Blumenfeld, Frank L. Neuhauser, Oscar B. Waddell and Joseph B. Forman ABSTRACT: A frequency to direct current converter is provided in which an input signal, which may be a sinusoidal wave or a pulse train, is applied to a first bistable logic circuit to determine its state. The logic circuit is utilized to provide an input indicative of an input signal to a second bistable logic circuit to which timing pulses are applied from an external clock source. The timing pulses initiate a change in the states of the bistable logic circuits so that a direct current pulse of uniform width is produced for each input wave applied to the first bistable circuit. The direct current pulses may be averaged or utilized to control a chopper circuit to produce a direct current output indicative of the frequency of the input signal.

Inventor
Douglas M. Bauer
by David Blumenfeld
His Attorney 3,601,707

FREQUENCY TO DIRECT CURRENT CONVERTER

BACKGROUND OF THE INVENTION

This invention relates to frequency measuring circuits. More specifically, it relates to a circuit for producing a direct current output indicative of the frequency of input signals applied thereto.

A frequency to direct current converter converts an input signal, which may be either s sinusoidal wave or a pulse train of fixed or variable frequency, to a direct current output indicative of the frequency of the input signal. Each cycle of the input signal is referred to as an input wave. One of the many uses for such a circuit is the conversion of a tachometer output signal indicative of the speed of an engine such as an aircraft engine to a direct current output suitable for coupling to a utilization device such as a direct current voltmeter. The tachometer produces a predetermined number of cycles of its output frequency for each revolution of the engine. In order to produce a direct current voltage accurately indicative of the speed of the engine, the converter must produce a discrete amount of direct current energy for each input wave.

Prior converters embody several schemes to do this. One form of converter utilizes the input wave to trigger a decaying signal which, from the time it begins until it decays to a predetermined level, comprises the converter output voltage. Such a scheme is complicated in construction and is dependent for accuracy on the precision of the values of components used to produce the output signal. The amount of direct current energy produced for each input wave may vary. For optimal results, the converter should operate to produce a pulse of uniform width for every input wave which pulses may then be averaged into a direct current voltage. While such arrangements have been provided, they have been both complicated and expensive.

SUMMARY OF THE INVENTION

It is therefore an object of the present invention to provide a frequency to direct current converter including a timing circuit whose accuracy is solely dependent upon an external clock source rather than circuit parameters.

It is a further object of the present invention to provide a frequency to direct current converter, the accuracy of which is solely dependent upon an external clock source and an external source of potential rather than parameters of the circuit.

It is a more specific object of the present invention to provide a frequency to direct current converter including a timing circuit, which produces output pulses of uniform width for each input wave.

It is also an object of the present invention to provide an accurate frequency to direct current converter which is extremely simple in construction.

Briefly stated, in accordance with the present invention there is provided a frequency to digital converter producing an output voltage directly indicative of the frequency of input waves applied thereto. The input signal, which may be in alternating frequency or pulse form, is coupled to a timing circuit including a first bistable logic circuit which changes state in response to an input wave to produce an output indicative of the presence of an input pulse. This output is coupled to enable a second bistable logic circuit to change state in response to a first timing pulse supplied from an external clock source. Upon changing state, the second logic circuit resets the first, and returns to its original state in response to the succeeding timing pulse. The timing circuit thus produces direct current pulses of uniform width in response to each input wave, which pulses may either be averaged or utilized to control a chopper circuit to produce a direct current output voltage.

BRIEF DESCRIPTION OF THE DRAWINGS

The foregoing objects are achieved by the present invention which is particularly pointed out in the claims forming the concluding portion of the specification. The invention, both as to its organization and manner of operation, as well as further objects and advantages attained with its use, may be further understood with reference to the following drawings taken in connection with the following description.

Of the drawings.

DESCRIPTION OF THE PREFERRED EMBODIMENTS

Figure 1:
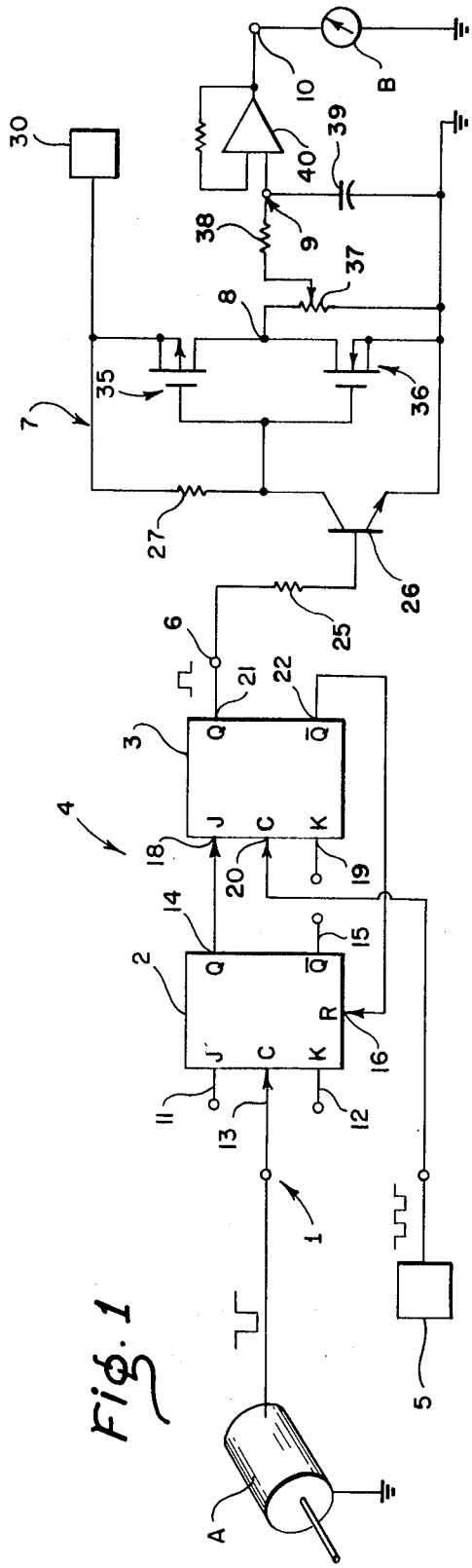
FIG. 1 is a schematic representation of a frequency to direct current converter constructed in accordance with the present invention connected between a source of input frequency and a direct current utilization device.

FIG. 1 is illustrative of a frequency to direct current converter constructed in accordance with the present invention. An input signal, which may be in the form of an alternating current or a pulse train, is applied to an input terminal 1. The input signal may comprise the output of a tachometer generator A or some other data-indicating signal. This input is coupled to an input terminal of a first bistable logic circuit 2 which changes state at initiation of an input wave. The change of state enables a bistable logic circuit 3 to produce an output when gated by an external source of timing pulses which in the present embodiment, are supplied from a conventional clock source 5. The bistable logic circuits 2 and 3 comprise a timing circuit 4. A first timing pulse from the clock 5 causes the second bistable logic circuit 3 to change state so as to produce an output at a direct current pulse terminal 6 and at the same time reset the first bistable logic circuit 2. Upon the occurrence of the succeeding timing pulse from the clock source 5, the output pulse appearing at the terminal 6 is terminated. The timing circuit 4 thus produces a direct current pulse of uniform width for each input wave. In order that the pulses provide a discrete amount of direct current energy, they must also be of uniform height. If the timing circuit 4 is constructed of components which produce pulses of uniform height, direct current filtering and utilization means may be directly coupled to the terminal 6. Alternatively, the direct current pulses may be coupled from the terminal 6 to control a direct current output circuit which, in this embodiment includes a chopper circuit 7 producing output pulses of uniform height appearing at a terminal 8 and a filter circuit 9 connected to the output terminal 8. A direct current voltage is provided at a terminal 10 for coupling to a utilization device such a direct current voltmeter B. A voltage follower circuit 40 may be connected between the filter circuit 9 and the terminal 10 to permit the converter to drive a load having current requirements exceeding the magnitude of current flowing through the filter circuit 9.

Referring now to FIG. 1 in greater detail, the bistable logic circuit 2 most conveniently comprises a J-K flip-flop circuit. A J-K flip-flop is a switching circuit having J and K input terminals respectively denoted by the reference numerals 11 and 12 and a clock input terminal 13. The J-K flip-flop has a Q output terminal 14, a Q̄ output terminal 15, and a reset terminal 16. The first or reset state is defined as that in which the logic level of the Q output is "zero" and that of the Q̄ output is "one." The following truth table defines the response of a J-K flip-flop to the appearance of a timing pulse at the clock terminal 13 when given inputs are applied to the J and K terminals 11 and 12.

|   | J | K | state of Q terminal K of flip-flop |
|---|---|---|---|
| 1 | 0 | 0 | $Q_n$ |
| 2 | 1 | 0 | 1 |
| 3 | 0 | 1 | 0 |
| 4 | 1 | 1 | $\overline{Q}_n$ | where $Q_n$ is the output at the Q terminal 14 before initiation of a timing pulse and $\overline{Q}_n$ is the opposite of $Q_n$.

The bistable logic circuit 3 may also comprise a J-K flip-flop similar to the flip-flop 2, having J and K terminals denoted 18 and 19 respectively and a clock input terminal 20. The flip-flop 3 further includes a Q output terminal 21 and a $\overline{Q}$ output terminal 22. The reset terminal of the flip-flop 3 is not utilized in the present embodiment.

A source of signal pulses, for example, the tachometer generator A, is coupled from the input terminal 1 to the clock terminal 13. In order that the flip-flop 2 will operate in accordance with the above truth table to produce a "one" output at the Q terminal 14 each time a timing pulse is received at the clock terminal 13, a potential having a "one" level is connected to the J terminal 11 from an external source (not shown). Either a "one" or a "zero" may be connected to the K terminal 11 without affecting the operation of the flip-flop 2. The Q output terminal 14 of the flip-flop 2 is connected to the J terminal 18 of the flip-flop 3 so that a "one" level appears there after an input pulse has been applied to the clock terminal 13 of the flip-flop 2. A "one" level is connected to the K terminal 19 from a source of potential (not shown). Timing pulses for changing the state of the output at the Q terminal 21 are provided from the external clock source 5 which is coupled to the clock terminal 20 of the flip-flop 3. The occurrence of a timing pulse at the terminal 20 while a "one" appears at the J terminal 18 causes the flip-flop 3 to change state so that a "one" appears at the Q output terminal 21. At the same time, a "zero" level appearing at the $\overline{Q}$ output terminal 22 is coupled to the reset terminal 6 of the flip-flop 2 causing it to reset so that a "zero" level is coupled from a Q terminal 14 to the J terminal 18. Thus when the next timing pulse is coupled from the clock 5 to the clock terminal 20, a "zero" is present at the J terminal 18, and as seen from line 3 of the truth table the output at the Q terminal 21 returns to "zero." In this manner, the width of the output pulse appearing at the direct current pulse terminal 6 which is generated for one input pulse applied to the input terminal 1 is made equal to the width of one timing pulse cycle.

The output at the terminal 6 may be utilized in one of two ways to produce a direct current output accurately indicative of the frequency of input waves. Where a flip-flop 3 is utilized that produces a "one" output signal having a precise voltage level, the output at the terminal 6 may be directly coupled to a direct current filter 9 which is coupled to a direct current utilization device. However, most flip-flops do not produce a precision level output. Therefore, in the present embodiment the chopper circuit 7 is connected between the direct current pulse terminal 6 and the filter circuit 9. The circuit comprises a resistor 25 which is coupled between the terminal 6 and the base of a control transistor 26. The emitter of the control transistor 26 is connected to ground, and its collector is coupled through a biasing resistor 27 for biasing from an external source of reference potential 30. In the present embodiment, the "one" level of the flip-flop 3 comprises a positive potential, and an NPN transistor 26 is used. First and second switching elements, which in this embodiment comprise metal oxide semiconductor field effect transistors 35 and 36, are connected between the external source of reference voltage 30 and ground. The gates of both field effect transistors are connected to the collector of the transistor 26 and their drain terminals are connected to the terminal 8. Both the substrate and source leads of the transistor 35 are connected to the reference source 30 and the substrate and source leads of the transistor 36 are connected to ground. The connection of the transistors 35 and 36, the transistor 35 being connected in negative-between the source 30 and the terminal 6 and the transistor 36 being connected for shunting the terminal 6 to ground, is known as a "series-shunt" connection. When connected in the above-described mode, the field effect transistors 35 and 36 operate similarly to conventional bipolar switching transistors having their bases connected to the collector transistor 26 and their collectors connected to the terminal 8.

In the absence of a "one" at the direct current pulse terminal 6, the transistor 26 is biased off so that the potential supplied from the potential source 30 is applied to the gates of the field effect transistors 35 and 36. Since the transistors 35 and 36 are of complementary types, the transistor 35 is biased off and the transistor 36 is turned on. The terminal 8 is then at ground potential and no direct current is coupled from the filter circuit 9 to the direct current output terminal 10. When the flip-flop 3 produces a "one" level at the Q terminal 21, the transistor 26 turns on so that the collector of the transistor 26 is at ground potential. The field effect transistor 36 turns off and the transistor 35 turns on to couple the potential of the source 30 to the terminal 8 and to the filter circuit 9. The filter circuit 9 comprises a resistor 38 coupled to the terminal 8 and a capacitor 38 connected from one terminal of the resistor 38 and ground. The terminal 8 may be directly connected to the resistor 38 or may be connected to a voltage dividing potentiometer 37 having its wiper arm connected to the resistor 38. Since the chopper circuit 7 couples the source 30 to the terminal 8 for a period of time proportional to that during which "one" level outputs are produced by the flip-flop 3, the converter provides a discrete amount of direct current energy for each input wave at the input terminal 1. Hence the direct current output at the terminal 10 is accurately indicative of the input signal frequency.

OPERATION

Figure 2:
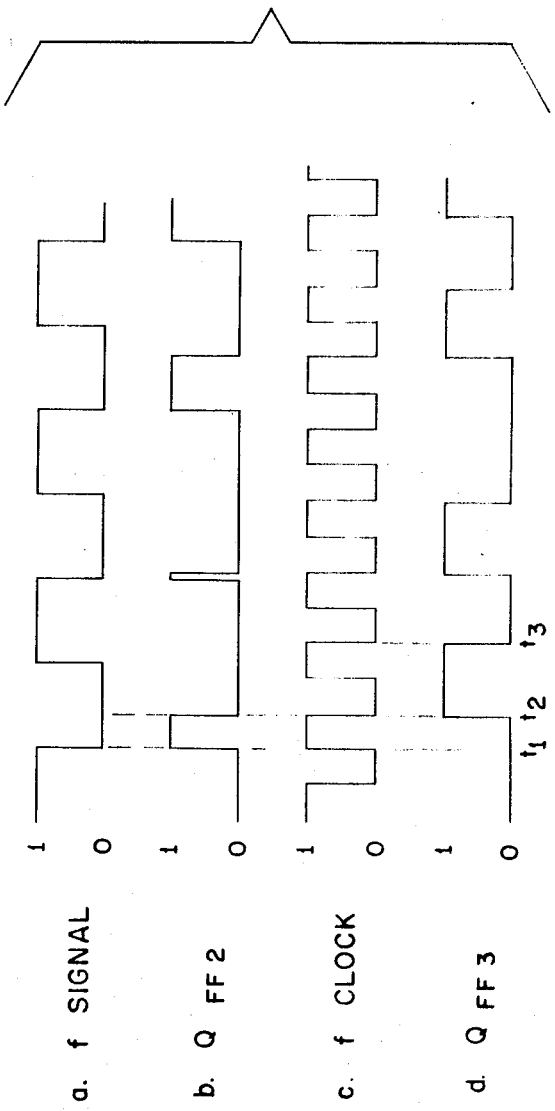
FIG. 2 is a timing diagram used for understanding the operation of the circuit of FIG. 1.

The operation of the present circuit may be most clearly seen by reference to FIG. 2 in which the abscissa is time. FIG. 2a, captioned f signal, is representative of an input signal applied to the terminal 1. FIG. 2b indicates the state at the Q terminal 14 of the flip-flop 2. FIG. 2c is captioned f clock, and is illustrative of the clock pulses applied to the clock terminal 20 of the flip-flop 3. FIG. 2d represents the state of the Q terminal 21 of the flip-flop 3 coupled to the output pulse terminal 6. With respect to both FIGS. 2a and 2c, a negative-going transition indicates the beginning of an input wave.

At the commencement of operation, the flip-flop 2 is in the reset state. At time $t_1$ an input wave is applied to the clock terminal 13 of the flip-flop 2. As seen from lines 2 and 4 of the truth table, a "one" output then appears at the Q terminal 14 (FIG. 2b) which is coupled to the J terminal 18 of the flip-flop 3. As seen from line 4 of the truth table, the flip-flop 3 changes state upon initiation of a timing pulse. This occurs at time $t_2$ and is indicated in FIGS. 2c and 2d. At the same time at which the state of the Q terminal 21 changes from "zero" to "one," the state of the $\overline{Q}$ terminal 22 changes from "one" to "zero" to reset the flip-flop 2. Thus at time $t_2$, the output at the Q terminal 14 goes to "zero" (FIG. 2b), and a "zero" level is coupled to the J terminal 18 of the flip-flop 3. As seen from line 3 of the truth table, the level at the Q terminal 21 will return to "zero" at the initiation of the next timing pulse. This occurs at time $t_3$. Thus as seen in FIG. 2d, an output pulse of uniform width is produced by the flip-flop 3 for every input wave applied to input terminal 1. It should be noted that in this embodiment, the frequency of the timing pulse provided from the external clock source 5 must be at least twice the frequency of the input signal to the clock terminal 13 so that there will be a negative-going transition applied to the clock terminal 20 of the flip-flop 3 during any time when a "one" level is applied to the J terminal 18 of the flip-flop 3. The embodiment of FIG. 1 operates to provide a duty cycle of the output of the flip-flop 3 from 0 to 50 percent.

By way of exemplification, a suitable circuit embodying the present invention has been constructed to produce a DC output representative of an input frequency of 0–4 kHz. utilizing the following components:

| flip-flop 2 | SN5473 |
|---|---|
| Flip-flop 3 | SN5473 |
| resistor 25 | 5K ohms |
| transistor 26 | 2N 3417 |
| resistor 27 | 10K ohms |
| field effect transistor 35 | 2N4352 |
| field effect transistor 36 | 2n4351 |
| potentiometer 37 | 50K ohms. |

The circuit also utilized an external clock source 5 supplying a clock frequency 10 kHz. and an external reference voltage source 30 supplying a potential of 10 volts. The values of the resistor 38 and capacitor 39 were chosen to provide a time constant equal to one-tenth the response time of the meter B. More specifically, since the meter B was of a type which took two seconds to reach full scale deflection upon application of a step input, the time constant of the filter circuit 9 was chosen to be 0.2 second.

Figure 3:
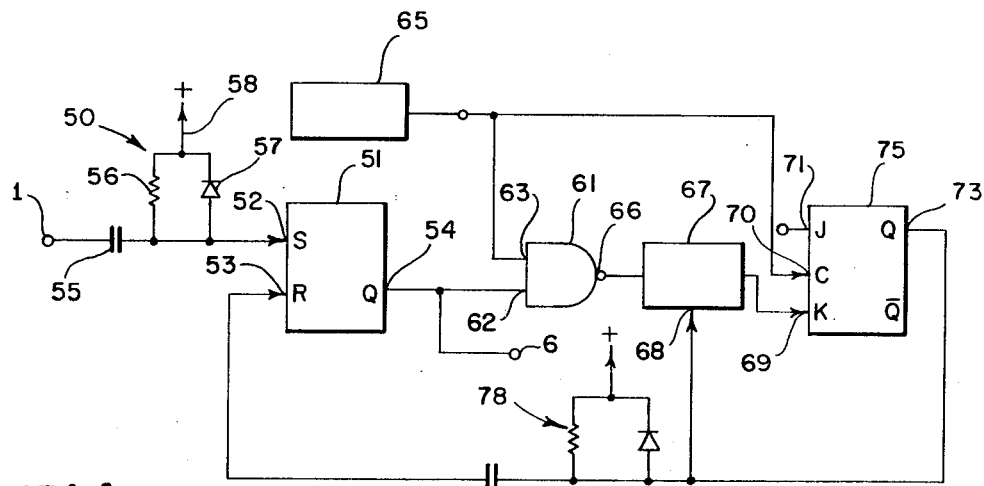
FIG. 3 is a schematic diagram of a further embodiment of the timing circuit included in the present invention.

FIG. 3 is illustrative of another form of frequency converter which may be connected between the signal input terminal 1 and the direct current pulse terminal 6. As in the circuit of FIG. 1, a first flip-flop changes from a first to a second state in response to an input signal and enables a second flip-flop to produce a uniform output pulse width for each signal input. Instead of using this pulse width as the output signal, however, the output of the first flip-flop comprises the output and it remains in its second state until the beginning of the output pulse of the second flip-flop. The initiation of the output pulse of the second flip-flop occurs a predetermined time after the change of state of the first flip-flop, and it is used to return the first flip-flop to its first state. Once again, the pulse appearing at the terminal 6 may be used to control a chopper circuit or may be directly coupled to a direct current filter circuit.

As seen in FIG. 3, the input wave from the terminal 1 is coupled to a wave-shaping circuit 50 and to an input or S terminal 52 of a set-reset flip-flop 51 which also includes a reset or R terminal 53 and a Q or output terminal 54. The set-reset flip-flop 51 operates such that when a pulse is applied to the S terminal, the output of the Q terminal 54 assumes a "one" state and remains in that state until a pulse is applied to the R terminal 53. At that 1 the output of the Q terminal 54 returns to a "zero" level. In order to convert input waves into pulse comprising the wave-shaping circuit 50, comprising a capacitor 55 connected in series between the input terminal 1 and S terminal 52 and a resistor 56 and a diode 57 connected in parallel between a source of positive potential 58 and the input terminal 52, is provided. The Q output terminal 54 is connected to a first input terminal 62 of a NAND gate 61. The NAND gate 61 further includes a second input terminal 63 coupled to an external clock source 65 and an output terminal 66 coupled to a counter 67 having a reset terminal 68, A J-K flip-flop 75 is provided which is similar to the J–K flip-flops utilized in the embodiment of FIG. 1 and includes a K terminal 69 coupled to the output of the counter 67, a clock terminal 70 coupled to the clock source 65 and a J terminal 71 which is connected to a source of potential (not shown) having a "one" logic level. The Q terminal 73 of the flip-flop 75 is coupled to the reset terminal 68 of the counter 67 and also through a wave-shaping circuit 78, similar to the circuit 50, to the R terminal 53 of the flip-flop 51. The $\overline{Q}$ terminal of the flip-flop 75 is not used.

Figure 4:
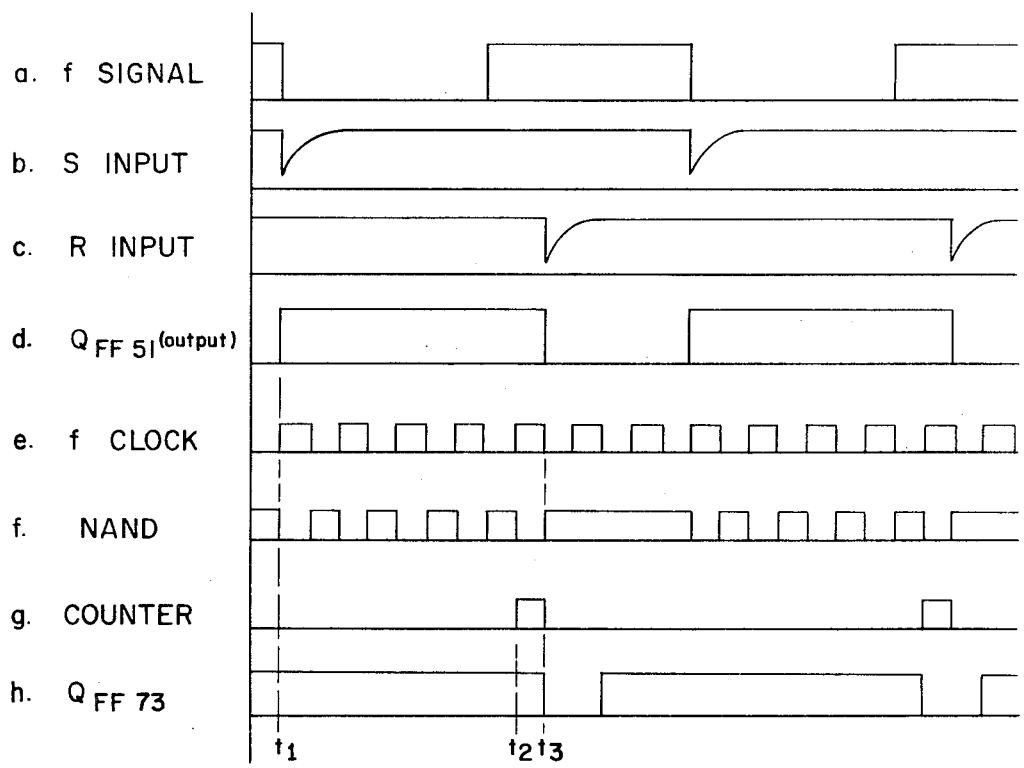
FIG. 4 is a timing diagram useful in understanding the operation of the embodiment illustrated in FIG. 3.

Reference should be had to FIG. 4 as well as FIG. 3 for analysis of the operation of the circuit. FIGS. 4a and 4b respectively represent an input pulse, which begins on the negative-going transition, applied to the input terminal 1 and the pulse coupled by the wave-shaping circuit 50 of the S terminal 52 of the set-reset flip-flop 51. Reset pulses applied to the R terminal 53 are shown in FIG. 4c. The state of the output at the Q terminal 54, which comprises the output at the terminal 6, is shown in FIG. 4d. FIGS. 4e and f represent the pulses produced by the external clock source 65 and the pulses appearing at the output terminal 66 of the NAND gate 61 respectively. The output of the counter 67 which is coupled to the K input is 69 of the flip-flop 75 is uncertainty in FIG. 4g and FIG. 4h represents the output at the uncertainty terminal 73 which constitutes a reset pulse when it goes to the "zero" level. The abscissa d each (N/b 2)in FIG. 4 is time.

The negative-going transition which constitutes the beginning of an input wave at the terminal 1 occurs at time $t_1$ (FIG. 4a), and the wave-shaping circuit 50 supplies the netative-going pulse which constitutes an input pulse to the S terminal 52 (FIG. 4b).

As seen in FIG. 4d, this changes the state at the Q terminal 54 of the flip-flop 51, and hence the level of the output terminal 6 changes from "zero" to "one." This "one" level is also coupled to the input terminal 62 of the NAND gate 61. As seen in FIG. 4f, when a "one" level is coupled to the input terminal 62, each time the level of the clock pulse goes to "one," a "zero" level appears at the output terminal 66 and when the clock pulse level goes to "zero," the output at the terminal 66 goes to "one." The counter 67 acts as a divider and is arranged to produce one output pulse cycle for a predetermined number, N, of input pulses from the output terminal 66 of the NAND gate 61. The counter 67 is chosen to produce a "zero" output during the first half-cycle and a "one" output for the second half-cycle. It produces a "zero" output until N/2 pulses are received at its input. For simplicity in illustration, N is chosen to be 8. The first pulse input to the counter 67 begins at a time $t_1$ as seen in FIG. 4f. After N/2, or four pulses, the output of the counter 67 goes from a "zero" state of a "one" state. This occurs at time $t_2$. At this time, a "one" level is applied to the K input terminal 69 of the flip-flop 75. As stated previously, a "one" level is connected to the J input terminal 71. Thus as may be seen from line 4 of the above truth table, at the initiation of the next clock pulse, which occurs at time $t_3$, the Q output at the terminal 73 goes from "one" to "zero." This output is coupled to the reset terminal 68 to reset the counter 67 (FIG. 4g) and is also coupled through the wave-shaping circuit 78 to the R terminal 53 (FIG. 4c) to reset the set-reset flip-flop 51 so that the output at the terminal 6 goes to "zero" (FIG. 4d).

It should be noted that the output of the clock source 65 is not synchronized with the input signal applied to the input terminal 1. While FIGS. 4a and 4e show an input wave and timing pulse both beginning at time $t_1$, in actual operation, they may be displaced from each other by a width of up to one timing pulse. This could result in the production of pulses by the NAND circuit 61 which initiate the counting operation of the counter 67 to start as much as one timing pulse width after time $t_1$. Thus, the initiation of a "one" level output pulse from the counter 67 (FIG. 4g) could occur up to one timing pulse after time $t_2$. The resulting uncertainty in the width of the output pulse appearing at the terminal 6 (FIG. 4d) is effectively eliminated by providing a high timing pulse rate such as $f_{clock} = 1000 f_{signal}$. The counter is then chosen to divide by 1000. Thus the resolution of the circuit in detecting input waves is increased, and the uncertainty in the beginning of the timing output pulses, commonly known as "jitter," is effectively eliminated. Since there is an uncertainty of one timing pulse at the beginning of the input wave and an uncertainty of one timing pulse at its end, the maximum width of the output signal shown in FIG. 4d is (N/2)+2 clock pulses. Since one clock pulse is required for resetting, the operating cycle of the frequency to DC converter of FIG. 3 must be at least (N/2)+3 pulses wide. Therefore, the maximum duty cycle of the present circuit is $$\frac{(N/2)+2}{(N/2)+3} \times 100$$

percent, or substantially a 100 percent for a maximum input frequency. Thus when the input signal has a frequency of 1/N·f clock, a very steady direct current output is produced. If a further flip-flop (not shown) were serially connected with the counter 67, it would require N clock pulses to produce the reset signal rather than N/2 as in the embodiment of FIG. 3. Thus the maximum duty cycle of the circuit could be raised to N+2/N+3×100 percent. Such a change is simply a matter of choice in making full utilization of the NAND gate 61 and counter 67 arrangement.

In the circuits of both FIG. 1 and FIG. 3, an input signal is coupled to a first flip-flop circuit to change its state. This change of state enables a second flip-flop to control the duration of a pulse at the output terminal 6. In the circuit of FIG. 1, an input signal at the terminal 1 is applied to clock terminal 13 so that a "one" level appears at the output terminal 14. This enables the flip-flop 3 to initiate an output pulse at the beginning of a clock pulse which output is terminated by a succeeding clock pulse. In the circuit of FIG. 3, the output at the Q terminal 54 of the flip-flop 51 is not only an enabling pulse, but also comprises the output pulse. The appearance of a "one" level at the output terminal 54 coupled to the input terminal 62 of the NAND gate 61 initiates a timing cycle in which the flip-flop 75 is timed by the clock source 65 to end the output pulse after a predetermined number of clock pulses. The embodiment of FIG. 1 utilizes a clock source 5 which is of relatively low frequency with respect to the frequency of the input signal, for example twice that of the input signal. The frequency of the clock source 65 of FIG. 3 may be 1000 times the input signal frequency.

Thus the present invention comprehends a frequency to direct current converter producing an output pulse which is accurately timed by a clock source rather than a converter which depends on a decaying pulse of an excited circuit or discharge time of RC circuits. A sufficiently large duty cycle for the output of the timing portion of the converter is provided so that an accurate direct current voltage may be produced therefrom.

Innumerable modifications may be made to produce a circuit constructed in accordance with the present invention. For example, the chopper circuit 7 in FIG. 1 may be comprised of conventional bipolar transistors rather than field effect transistors, one of the transistors having its base connected to the Q terminal 21 and the other of which has its base connected to the $\overline{Q}$ terminal 22 in order to provide a positive switching action. Also, many forms of logic circuits could be used to control the states of the voltage at the various output terminals within the circuit. For example, the set-reset flip-flop 51 of the circuit of FIG. 3 could be replaced by a first NAND gate having one input terminal coupled to the output terminal of a second NAND gate. The output of the first NAND gate would then be coupled to the first input of the second NAND gate, as well as the NAND gate 61 and the second input of the second NAND gate would be coupled to a source of reset pulses. Various other modifications are possible.

What I claim as new and desire to be secured by Letters Patent of the United States is;

1. A frequency to direct current converter for connection between a source of input signals and a direct current utilization means for producing a direct current output signal, the magnitude of which is a direct measure of the frequency of the input signals;
   1. means for producing a fixed output pulse for each input wave including a timing circuit for controlling the output of said converter comprising in combination:
      a. a first bistable logic circuit having an input terminal coupled to a source of input signals, an output terminal, and a reset terminal, said first bistable logic circuit being changed from a first state to a second state upon initiation of an input signal at said input terminal;
      b. a second bistable logic circuit having a first input terminal coupled to be responsive to the state of said first bistable logic circuit, a clock input terminal connection to an external source of timing pulses, and an output terminal, said second bistable circuit being enabled to change state from a first state to a second state when said first bistable logic circuit is in its second state, said second bistable logic circuit changing from a first state to a second state in response to a first timing pulse and returning to its first state in response to a succeeding timing pulse; and
      c. means coupling said second bistable logic circuit to said first bistable logic circuit for resetting said first bistable logic circuit to its first state when said second bistable logic circuit changes to its second state to produce thereby a fixed output pulses;
   2. signal averaging circuit means coupled to the output of said timing circuit to produce a direct current signal in response to each of the fixed output pulses so that the amplitude of the direct current output signal from said averaging circuit means is proportional to the number of the fixed output pulses and consequently, a measure of the input signal frequency.

2. A timing circuit according to claim 1 in which the output terminal of said first bistable logic circuit is directly coupled to the input of said second bistable logic circuit, the output of said timing circuit being derived from the output terminal of said second bistable logic circuit.

3. A timing circuit according to claim 2 wherein said first and second bistable logic circuits comprise J-K flip-flops.

4. A frequency to direct current converter for connection between a source of input signals and a direct current utilization means for producing a direct current output signal the magnitude of which is a direct measure of the frequency of the input signals; means for producing a fixed output pulse for each input wave including a timing circuit for controlling the output of said converter comprising in combination:
   a. a first bistable logic circuit having an input terminal coupled to a source of input signals, an output terminal, and a reset terminal, said first bistable logic circuit being changed from a first state to a second state upon initiation of an input signal at said input terminal;
   b. a second bistable logic circuit having a first input terminal coupled to be responsive to the state of said first bistable logic circuit, a clock input terminal for connection to an external source of timing pulses and an output terminal, said second bistable circuit being enabled to change state from a first state to a second state when said first bistable logic circuit is in its second state, said second bistable logic circuit changing from a first state to a second state in response to a first timing pulse, and returning to its first state in response to a succeeding timing pulse and
   c. means coupling said second bistable logic circuit to said first bistable logic circuit for resetting said first bistable logic circuit to its first state when said second bistable logic circuit changes to its second state to produce fixed output pulses.
   d. A NAND gate having a first input terminal connected to the output terminal of said first bistable logic circuit, a second input terminal coupled to the external source of timing pulses and an output terminal;
   e. a counter having an input terminal connected to the output terminal of said NAND gate and an output terminal connected to the input terminal of said second bistable logic circuit, said NAND gate producing output pulses when said first bistable logic circuit is in its second state, and said counter providing an enabling input to said second bistable logic circuit a predetermined number of timing pulses after said first bistable logic circuit changes state in response to an input signal; and
   f. means coupled from said second bistable logic circuit to return said first bistable logic circuit to its original state when said second bistable logic circuit changes from its first state to its second state.

5. The timing circuit of claim 4 in which the output of said first bistable logic circuit comprises the output of said timing circuit.

6. A frequency to direct current converter for connection between a source of input signals and a direct current utilization means, comprising in combination:
   a. a timing circuit comprising:
      1. a first bistable logic circuit having an input terminal coupled to the source of input signals, an output terminal, and a reset terminal, said first bistable logic circuit being changed from a first state to a second state upon initiation of an input signal at said input terminal;
      2. a second bistable logic circuit having a first input terminal coupled to be responsive to the state of said first bistable logic circuit, a clock input terminal for connection to an external source of timing pulses and an output terminal, said second bistable circuit being enabled to change state when an input is applied to its input terminal in response to said first bistable logic circuit being in its second state, and said second bistable logic circuit changing from a first state to a second state in responsible to a first timing pulse and returning to its first state in response to a succeeding timing pulse; and
      3. means coupling said second bistable logic circuit to said first bistable logic circuit for returning said first bistable logic circuit to its first state when said second bistable logic circuit changes to its second state;
   b. a direct current shopper circuit for connection to an external source of potential, said chopper circuit being connected to be controlled by said timing circuit whereby the magnitude of its output potential is determined; and
   c. coupling means coupling the output of said chopper circuit to the direct current utilization means.

7. A converter according to claim 6 in which the output terminal of said first bistable logic circuit is directly coupled to the input of said second bistable logic circuit, and said chopper circuit is coupled to the output terminal of said second bistable logic circuit to determine the output of said converter.